(12) United States Patent
Li et al.

(10) Patent No.: US 9,251,556 B2
(45) Date of Patent: Feb. 2, 2016

(54) DISPLAY CONTROL METHOD AND SYSTEM AND DISPLAY DEVICE

(71) Applicant: Huawei Technologies Co., Ltd., Shenzhen, Guangdong (CN)

(72) Inventors: Zhe Li, Shanghai (CN); Jun Huang, Shanghai (CN); Jiayin Lu, Shanghai (CN); Jianbo He, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 13/902,081

(22) Filed: May 24, 2013

(65) Prior Publication Data

US 2013/0321438 A1 Dec. 5, 2013

(30) Foreign Application Priority Data

May 25, 2012 (CN) .......................... 2012 1 0165572

(51) Int. Cl.
*G06T 1/60* (2006.01)
*G09G 3/20* (2006.01)
*G09G 5/00* (2006.01)

(52) U.S. Cl.
CPC ................ *G06T 1/60* (2013.01); *G09G 3/2096* (2013.01); *G09G 5/006* (2013.01); *G09G 2350/00* (2013.01); *G09G 2360/12* (2013.01); *G09G 2360/121* (2013.01)

(58) Field of Classification Search
CPC ............. G06T 1/60; G06T 1/20; G06T 15/00; G06T 15/405; G06F 9/3879; G06F 9/3885; G06F 9/3897; G06F 17/147
See application file for complete search history.

(56) References Cited

U.S. PATENT DOCUMENTS

| | | | |
|---|---|---|---|
| 5,900,886 A | 5/1999 | Shay | |
| 5,915,040 A | 6/1999 | Yatomi et al. | |
| 5,960,193 A | 9/1999 | Guttag | |
| 6,067,613 A | 5/2000 | Balmer | |
| 6,499,072 B1 * | 12/2002 | Frank et al. | .................... 710/100 |
| 2004/0056865 A1 | 3/2004 | Shimomura et al. | |

* cited by examiner

*Primary Examiner* — Maurice L McDowell, Jr.
*Assistant Examiner* — Raffi Isanians
(74) *Attorney, Agent, or Firm* — Leydig, Voit & Mayer, Ltd.

(57) ABSTRACT

The present invention provides a display control method and system, and a display device. The method includes acquiring a status value of a display buffer; comparing the status value of the display buffer with a preset warning value of the display buffer; and adjusting a value of a depth of outstanding bus commands according to a comparison result. In the embodiments of the present invention, a status value of the display buffer is compared with a preset warning value of the display buffer, where the status value of the display buffer reflects a change to a current load; it may be determined whether a status value of the display buffer corresponding to the current load is normal according to a comparison result; and a value of a depth of outstanding bus commands is adjusted accordingly, effectively resolve a data real-timeness issue, and ensure that an entire system efficiently runs.

16 Claims, 2 Drawing Sheets ated accordingly to guarantee the real-timeness requirement of display.

DISPLAY CONTROL METHOD AND SYSTEM AND DISPLAY DEVICE

CROSS-REFERENCE TO RELATED APPLICATIONS

This application claims priority to Chinese Patent Application No. 201210165572.6, filed on May 25, 2012, which is hereby incorporated by reference in its entirety.

FIELD OF THE INVENTION

The present invention relates to the multimedia control field, and in particular, to a display control method and system and a display device.

BACKGROUND OF THE INVENTION

Currently, a display part of a multimedia device may be generally divided into two parts: a main control chip and a display module group. The main control chip includes a processor, a graphics engine module, a video codec module, and a display control module, and is configured to send obtained image data to the display module group by using a specific interface protocol according to a user requirement. The display module group includes a display screen and a display driving chip, and is mainly configured to receive, according to a particular interface protocol, image data sent by the main control chip and convert the image data into a scanning signal of the screen.

With development of microelectronic technologies, the main control chip of a multimedia device has developed from an ASIC (Application Specific Integrated Circuit: application specific integrated circuit) to an SOC (System On Chip) chip based on an AXI (Advanced eXtensible Interface: advanced extensible interface) bus. Generally, the SOC chip has a display control module, which is configured to read a processed image (such as an image decoded by a decoding module or drawn by a graphics processing unit) from a DDR (Double Data Rate: double data rate synchronous dynamic random access memory) and send the image to the display module group.

Using an SOC chip as the main control chip effectively reduces the volume of a product and shortens the development period of the product, but at the same time, brings a certain limitation. An AXI bus is added in the display control module; therefore, latency (Latency) increases for the display control module to read a burst (burst) of data from the DDR. This latency varies according to different system loads and bus frequency states, so that the real-timeness of such a real-time (real time) service module as the display control module cannot be guaranteed.

To resolve the real-timeness issue, an existing SOC technology generally resolves the latency by raising a priority of the display control module in the AXI bus, adding a buffer (Buffer), and increasing a frequency and a data bit width of the AXI bus. The following are two common methods:

Method 1: Reduce the latency by adding a buffer. In a diagram of architecture of a main control chip shown in FIG. 1, a main control chip 109 includes a display control module 107, advanced extensible interface buses 101 and 102, and DDR controllers 103 and 104, where the display control module 107 connects to a display module 108. Two DDRCs 103 and 104 (DDR Controller: DDR controller), which connect to the advanced extensible interface AXI buses 101 and 102 of the man control chip, connect to DDRs 105 and 106, respectively. One of the two DDRCs 103 and 104 is set especially for a display buffer and certain multimedia applications, and bus architecture and display architecture are optimized accordingly to guarantee the real-timeness requirement of display.

Defects of the structure are as follows:

1. By using double DDRs and corresponding design, the area of the chip increases as the display buffer increases. This raises a design cost and at the same time increases system power consumption. For a multimedia play field, especially a mobile multimedia field such as a mobile phone, the power consumption issue is not acceptable.

2. Since the display architecture and bus architecture are adjusted and optimized accordingly, an underlying driver needs to be re-developed so that the underlying driver supports an open operating system. This brings a high product cost.

Method 2: Set a high priority for the display control module in the AXI bus of the SOC main control chip to preferentially guarantee bandwidth, increase the frequency and data bit width of the bus to provide absolute bandwidth supply, and raise the display buffer to guarantee display bandwidth, thereby ensuring that a splash screen or erratic display does not occur.

This method has the following defects:

1. After a high priority is configured for the display control module in the AXI bus, the display control module occupies most high-priority bandwidth in the AXI bus. This lowers utilization efficiency of DDR bandwidth. To improve bandwidth utilization efficiency of the DDR bandwidth, a system needs to operate at a relatively high frequency. This inevitably raises the operating power consumption of the system.

2. While a high priority is configured for the display control module in the AXI bus, the real-timeness of other real-time service modules is surely affected during the running process of the display control module. This increases their latency, thereby affecting the overall efficiency of the system.

SUMMARY OF THE INVENTION

The objectives of the embodiments of the present invention are to provide a display control method and system, an apparatus, and a device, so that a system runs with low power consumption while a system cost, real-timeness, and system operating efficiency are guaranteed.

An embodiment of the present invention is implemented as follows. A display control method, including:

acquiring a status value of a display buffer;

comparing the status value of the display buffer with a preset warning value of the display buffer; and adjusting a value of a depth of outstanding bus commands according to a comparison result.

Another objective of an embodiment of the present invention is to provide a display control system. The system includes:

an acquiring unit, configured to acquire a status value of a display buffer;

a comparing unit, configured to compare the status value of the display buffer with a preset warning value of the display buffer; and an adjusting unit, configured to adjust a value of a depth of outstanding bus commands according to a comparison result.

Still another objective of an embodiment of the present invention is to provide a display device, including the display control system.

In the embodiments of the present invention, first, data collection is performed on a status value of a display buffer to obtain a specific status value of the display buffer, where the status value of the display buffer reflects a change to a current load; the status value of the display buffer is compared with a preset warning value of the display buffer; it may be determined whether a status value of the display buffer corresponding to the current load is normal according to a comparison result; and a value of a depth of outstanding bus commands is adjusted accordingly, so that a bus is still capable of sending a data reading command, so as to guarantee display bandwidth and effectively resolve a data real-timeness issue. In addition, the adjustment does not affect priorities of other commands on the bus and ensures that an entire system efficiently runs. In comparison with Method 1, the increase of a cost and power consumption caused by adding other components may be avoided. Furthermore, adjusting the value of the depth of outstanding bus commands achieves lower power consumption as compared with an existing method of raising a bus frequency.

DETAILED DESCRIPTION OF THE EMBODIMENTS

Figure 1:
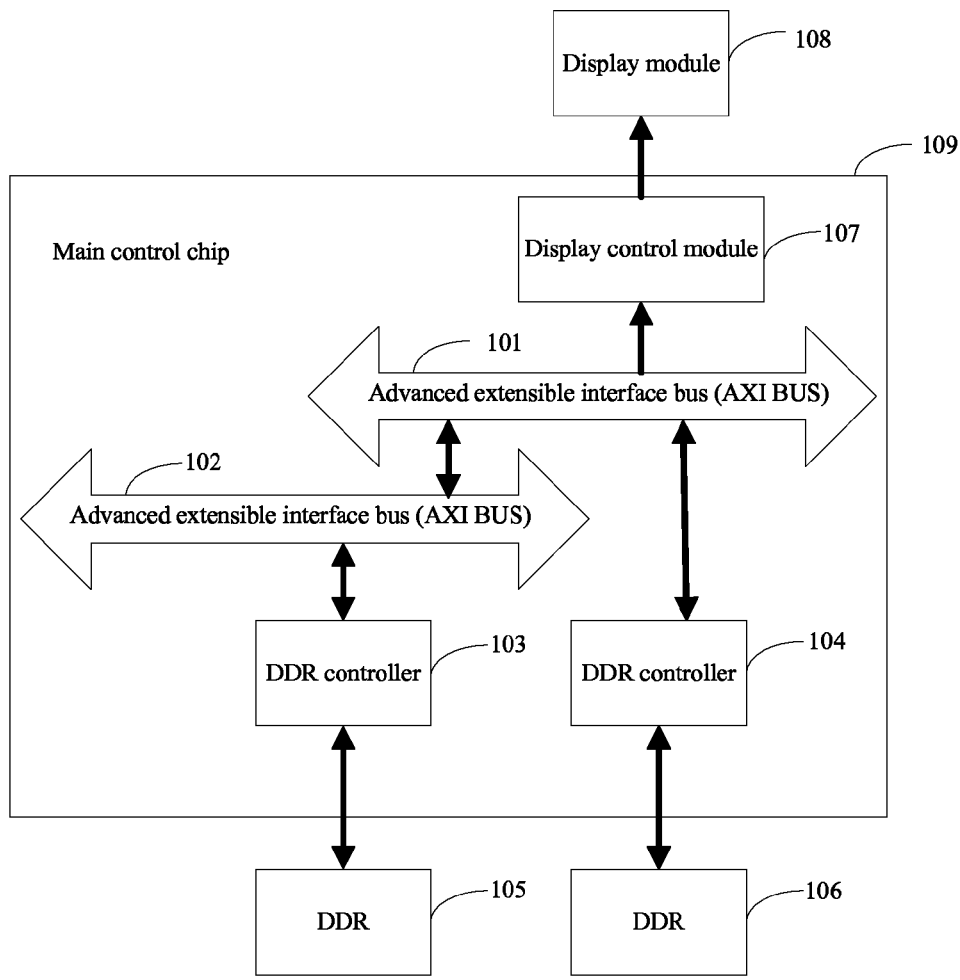
FIG. 1 is a block diagram of a main control chip that uses dual-DDR architecture provided in the prior art.

To make the objectives, technical solutions, and advantages of the present invention more comprehensible, the following further describes the present invention in detail with reference to the accompanying drawings and embodiments. It is understandable that the specific embodiments to be described are merely used to explain the present invention but not intended to limit the present invention.

For defects of solutions in the prior art, an embodiment of the present invention provides a method of automatically adjusting a depth of outstanding bus commands according to a system load, thereby ensuring that an advanced extensible bus AXI bus operates at a proper frequency and guaranteeing low system power consumption while effectively guaranteeing the real-timeness of display bandwidth.

A display control method according to an embodiment of the present invention includes acquiring a status value of a display buffer, comparing the status value of the display buffer with a preset warning value of the display buffer, and adjusting a depth of outstanding bus commands according to a comparison result. The status value of the display buffer is collected, and the status value of the display buffer reflects a change to a current load. The obtained warning value of the display buffer is a specific value, so that it may be compared with the preset warning value of the display buffer. After the status value of the display buffer is compared with the preset warning value of the display buffer, it is determined whether a status value of the display buffer corresponding to the current load is normal. If the load is excessively large, a value of the depth of outstanding bus commands is enlarged, so that a bus is still capable of sending a data reading command as long as the number of sent commands is controlled to be not larger than an value that is set for the depth of outstanding bus commands, thereby guaranteeing the display bandwidth and effectively resolving a data real-timeness issue. In addition, the adjustment does not affect priorities of other commands on the bus and ensures that an entire system efficiently runs. In comparison with Method 1 mentioned in the background, the increase of a cost and power consumption caused by adding other components may be avoided. Furthermore, adjusting the value of the depth of outstanding bus commands achieves lower power consumption as compared with an existing method of raising a bus frequency.

Here, the depth of outstanding bus commands is explained as follows:

As can be known, after a control command for reading data is sent in a common process of controlling read and write, a data result to be returned for the command is awaited. Here, the depth of outstanding bus commands is the number of commands that may be simultaneously sent if a command is sent to the bus and data returned for the command is not received. Increasing the value of the depth of outstanding bus commands may effectively reduce latency of other commands, so that the system operates at a proper operating frequency while the display bandwidth is guaranteed.

The technical solutions of the present invention are described below from perspectives of a display control method and system, and an apparatus.

Embodiment 1

Figure 2:
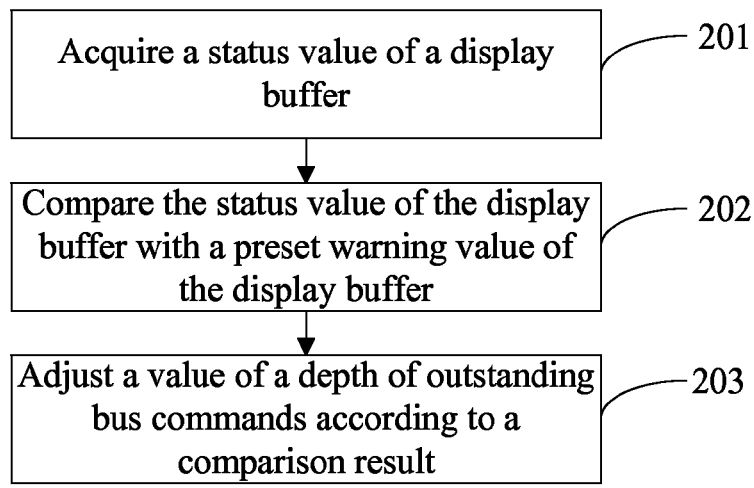
FIG. 2 is a flowchart of implementation of display control method according to Embodiment 1 of the present invention.

FIG. 2 shows a flowchart of a display control method according to Embodiment 1 of the present invention. The method is described in detail in the following:

In step S201, a status value of a display buffer is acquired.

Specifically, from a synchronous FIFO (First In First Out, first in first out) buffer, a synchronous write pointer signal Wr_ptr[n:0] and read pointer signal Rd_ptr[n:0] are read, and are sent to a comparing unit. In the comparing unit, a status value Fifo_full_level[n:0] of the display buffer is obtained according to addresses to which a read pointer and a write pointer point.

Specifically, obtaining a status of the buffer according to a read pointer and a write pointer is as follows: When each frame of image starts to be transmitted, display data is downloaded in advance to the display buffer in a blanking time; and after the valid time of display starts, the display data is output, the display data is output according to uniform bandwidth. When the read pointer and the write pointer are reading and writing the FIFO buffer, a current status value of the display buffer may be obtained after an absolute value of an address difference between the read pointer and the write pointer is taken and a sequence of the read pointer and the write pointer is determined. The current status value may be used to represent the number of data bits written in the display buffer. Of course, the number of idle data bits of the display buffer may also be used for representing the current status value of the display buffer. In terms of an algorithm, the current status value of the display buffer may be obtained by using the capacity of the buffer and the number of data bits written in the display buffer. In addition, corresponding logical adjustment is also required during the comparison described in following embodiments.

According to the description in the prior art, for an asynchronous FIFO, a status value of the display buffer may also be obtained according to pointer addresses. Details are not repeated herein.

In step S202, the status value of the display buffer is compared with a preset warning value of the display buffer.

Specifically, the preset warning value of the display buffer may be obtained from the analysis made through system-level simulation of a typical scenario of a system. This certainly includes fine-tuning the preset warning value of the display buffer according to a test record made during product commissioning, so as to achieve a best implementation effect.

The status value of the display buffer obtained in step S201, which is the absolute value (the number of data bits written in the display buffer currently) of the address difference between the read pointer and the write pointer when the write pointer is before the read pointer, is compared with the warning value of the display buffer.

In step S203, a value of a depth of outstanding bus commands is adjusted according to a comparison result.

Specifically, the depth of outstanding bus commands is automatically set to a typical value when the system is powered on.

As described in step S202, when the write pointer is before the read pointer, the absolute value of the address difference between the read pointer and the write pointer is taken as the status value of the display buffer; when the read pointer is before the write pointer, the absolute value of the address difference between the read pointer and the write pointer is taken and then an absolute value of a difference between the absolute value and the capacity of the display buffer is taken as the status value of the display buffer, and the status value of the display buffer is compared with the preset warning value of the display buffer. When the status value of the display buffer is smaller than the preset warning value of the display buffer, the value of the depth of outstanding bus commands is controlled to be a value of a maximum depth of outstanding bus commands. When the status value of the display buffer is not smaller than the preset warning value of the display buffer, the value of the depth of outstanding bus commands is controlled to be a typical value.

Here, two parameters to be adjusted, which are a typical depth of outstanding bus commands and a maximum depth of outstanding bus commands, may be obtained from an analysis made through system-level simulation of a typical scenario of the system, and an optimal value is determined according to the setting of the system itself. In addition, multiple values may be set for the depth of outstanding bus commands according to an actual situation, and more careful adjustment is performed to improve the operating precision of the system.

For example, the value of the typical depth of outstanding bus commands is set to 4 and the value of the maximum depth of outstanding bus commands is set to 16 in this embodiment. The depth of outstanding bus commands is adjusted between the two states according to the load of the system, to ensure that display is normal while the display bandwidth of the system is guaranteed.

In this embodiment, a change to a system load is represented by a status value of a display buffer, and a value of a depth of outstanding bus commands is adjusted according to the status value of the display buffer, so that the bandwidth of a system is guaranteed and latency of the system is reduced. No extra device cost is required in the entire process, and basically, the power consumption of the system is not increased.

Embodiment 2

Figure 3:
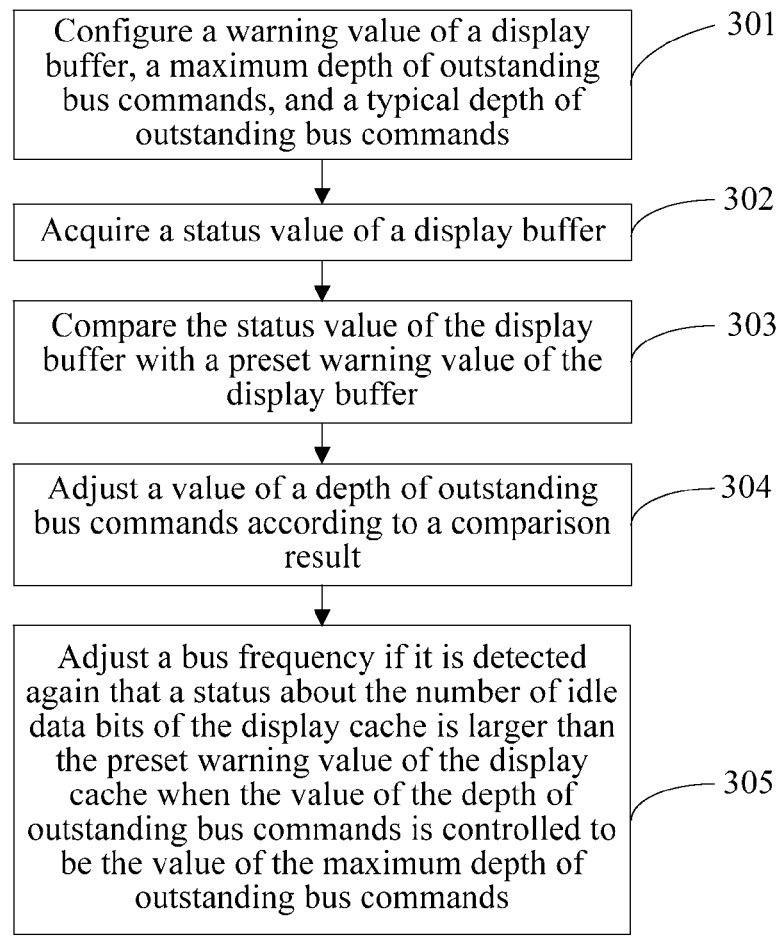
FIG. 3 is a flowchart of implementation of display control method according to Embodiment 2 of the present invention.

FIG. 3 shows a flowchart of a display control method according to Embodiment 2 of the present invention. The method is described in detail as follows:

In step S301, a warning value of a display buffer, a maximum depth of outstanding bus commands, and a typical depth of outstanding bus commands are configured.

In this embodiment, display bandwidth is guaranteed by adjusting the maximum depth of outstanding bus commands and the typical depth of outstanding bus commands according to a change to a status value of the display buffer, where the status value of the display buffer is reflected by the load of a system.

Setting the warning value of the display buffer, the maximum depth of outstanding bus commands, and the typical depth of outstanding bus commands is already introduced in Embodiment 1, and is not repeated herein.

In step S302, a status about the number of idle data bits of the display buffer is acquired.

In the method described in step S201 according to Embodiment 1, when the write pointer is before the read pointer, the absolute value of the address difference between the read pointer and the write pointer is taken and then an absolute value of a difference between the absolute value and the capacity of the buffer is taken; when the read pointer is before the write pointer, the absolute value of the address difference between the read pointer and the write pointer is taken; and therefore, the status about the number of idle data bits of the display buffer is acquired, where the status is a specific numerical value.

In step S303, the status value of the display buffer is compared with the preset warning value of the display buffer.

In step S304, a value of a depth of outstanding bus commands is adjusted according to a comparison result.

When the obtained status about the number of idle data bits of the display buffer is compared with the preset warning value of the display buffer, corresponding logical adjustment is performed:

when the status about the number of idle data bits of the display buffer is larger than the preset warning value of the display buffer, the value of the depth of outstanding bus commands is controlled to be the value of the maximum depth of outstanding bus commands; when the status about the number of idle data bits of the display buffer is not larger than the preset warning value of the display buffer, the value of the depth of outstanding bus commands is controlled to be a typical value.

In step S305, when the value of the depth of outstanding bus commands is controlled to be the value of the maximum depth of outstanding bus commands, if it is again detected that the status about the number of idle data bits of the display buffer is larger than the preset warning value of the display buffer, a bus frequency is adjusted.

The objective of this step is as follows: in a case where a load increases, when the maximum depth of outstanding bus commands is controlled by the adjustment, if the requirement of the load on display bandwidth still cannot be met, and a bus adapter detects that the current load of the system increases and the current requirement cannot be met, the requirement of the current load for the system is temporarily met by raising the bus frequency and scarifying power consumption; if the load decreases, the bus adapter detects that the load decreases, and the bus frequency is preferentially reduced and the power consumption is preferentially reduced; if decrease of the load is still detected after the bus frequency is reduced, the value of the depth of outstanding bus commands is further adjusted.

The difference between this embodiment and Embodiment 1 lies in that compared data is logically modified and the status about the number of idle data bits of the display buffer is used. In addition, in a case where a load increases, when a value of a depth of outstanding bus commands is adjusted and a current requirement cannot be met, the requirement of the current system is met by raising a bus frequency. When the load decreases, a control command for reducing the bus frequency is sent by comparing a detected status about the number of idle data bits of the display buffer with a warning value of the display buffer, so as to reduce power consumption of the system. In this way, adaptability of implementing the present invention can be much stronger.

Embodiment 3

Figure 4:
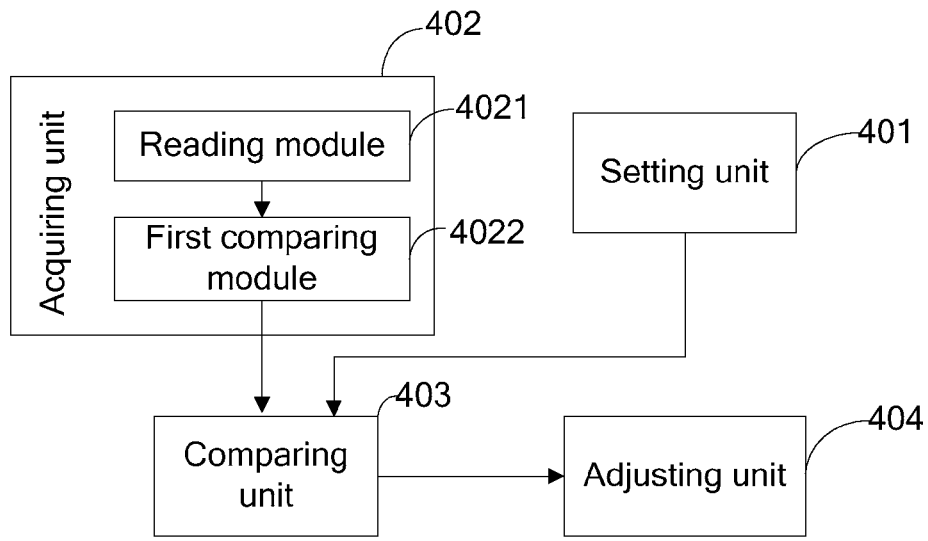
FIG. 4 is a block diagram of a display control system according to Embodiment 3 of the present invention.

FIG. 4 is a block diagram of a display control system according to Embodiment 3 of the present invention.

The display control system according to the embodiment of the present invention includes:

a configuring unit 401, configured to obtain a relatively good warning value of a display buffer, a maximum depth of outstanding bus commands, and a typical depth of outstanding bus commands according to system-level simulation of a typical scenario of a system, and perform fine adjustment through a test;

an acquiring unit 402, configured to acquire a status value of the display buffer; where:

the acquiring unit 402 includes:

a reading module 4021, configured to read a read pointer signal and a write pointer signal of the display buffer; and a first comparing module 4022, configured to compare addresses to which a read pointer and a write pointer point and obtain the status value of the display buffer.

Specifically, from a synchronous FIFO (First In First Out, first in first out) buffer, a synchronous write pointer signal Wr_ptr[n:0] and read pointer signal Rd_ptr[n:0] are read and are sent to a comparing unit. In the comparing unit, the status value Fifo_full_level[n:0] of the display buffer is obtained according to the addresses to which the read pointer and the write pointer point.

Specifically, obtaining a status of the buffer according to a read pointer and a write pointer is as follows: When each frame of image starts to be transmitted, display data is downloaded in advance to the display buffer in a blanking time; and after the display data is output at the beginning of the valid time of display, the display data is output according to uniform bandwidth. When the read pointer and the write pointer are reading and writing the FIFO buffer, a current status value of the display buffer may be obtained after an absolute value of an address difference between the read pointer and the write pointer is taken and a sequence of the read pointer and the write pointer is determined. The current status value may be used to represent the number of data bits written in the display buffer. Of course, the number of idle data bits of the display buffer may also be used for representing the current status value of the display buffer. In terms of an algorithm, the current status value of the display buffer may be obtained by using the capacity of the buffer and the number of data bits written in the display buffer. In addition, corresponding logical adjustment is also required during the comparison described in following embodiments.

a comparing unit 403, configured to compare the status value of the display buffer with a preset warning value of the display buffer; and an adjusting unit 404, configured to adjust a value of a depth of outstanding bus commands according to a comparison result.

Specifically, the status value of the display buffer is as follows: when the write pointer is before the read pointer, an absolute value of an address difference between the read pointer and the write pointer is taken; when the read pointer is before the write pointer, the absolute value of the address difference between the read pointer and the write pointer is taken and then an absolute value of a difference between the absolute value and the capacity of the display buffer is taken. The status value of the display buffer is compared with the preset warning value of the display buffer.

The adjusting unit is configured to, when the status value of the display buffer is smaller than the preset warning value of the display buffer, control the value of the depth of outstanding bus commands to be a value of the maximum depth of outstanding bus commands; when the status value of the display buffer is not smaller than the preset warning value of the display buffer, control the value of the depth of outstanding bus commands to be a typical value.

This embodiment provides a soft system corresponding to Embodiment 1 of the present invention. A depth of outstanding bus commands is adjusted according to the load of a system represented by a status value of a display buffer, so that access latency is reduced while display bandwidth is guaranteed.

Embodiment 4

This embodiment is used to describe a display control apparatus, including:

a display buffer monitoring module, configured to monitor a status value of a display buffer, compare the status value of the display buffer with a preset warning value of the display buffer after acquiring the status value of the display buffer, and send a comparison result to a module for controlling a depth of outstanding bus commands; and a module for controlling a depth of outstanding bus commands, configured to receive the comparison result sent by the display buffer monitoring module and adjust the status of the depth of outstanding bus commands according to the comparison result.

The display buffer monitoring module reflects a status of the load of a system on a current bus according to the status value of the display buffer. A specific implementation manner is described as follows:

1. Wr_ptr[n:0] (a write pointer signal) and Rd_ptr[n:0] (a read pointer signal) that are already synchronous are sent to a comparing module Compare.

2. The Fifo_full_level [n:0] (the status of a water line level) signal of the current display buffer is output to the module for controlling a depth of outstanding bus commands, where the Fifo_full_level[n:0] signal is obtained after a comparing unit compares a read pointer and a write pointer.

3. A frame synchronization signal (Vsync) and the like are required for controlling setting and clearing of a status of each frame.

The module for controlling a depth of outstanding bus commands adjusts a value of a maximum depth of outstanding bus commands of direct memory access DMA (Direct Memory Access) according to a status value signal of the display buffer and a configured warning value of the display buffer, where the status value signal of the display buffer is output by a display buffer monitoring module. A specific manner is as follows:

1. A selection signal of a current value Max_OSD[m:0] of the maximum depth of outstanding bus commands is generated according to the comparison between a warning value Fifo_level_lim[n:0] of the display buffer and a status value Fifo_full_level[n:0] of the display buffer, where the warning value Fifo_level_lim[n:0] is configured through software and the status value Fifo_full_level[n:0] is output by the display buffer monitoring module.

When the Fifo_level_lim[n:0] is larger than the Fifo_full_level[n:0], the Max_OSD[m:0] is selected. In this case, an optimal value needs to be determined as a value of the maximum depth of outstanding bus commands according to its own system design. In the design, an adopted value is 16.

When the Fifo_level_lim[n:0] is smaller than the Fifo_full_level[n:0], a typical depth Cfg_OSD[m:0] of outstanding bus commands is selected. The value of the maximum depth of outstanding bus commands needs to be a typical value of the depth of outstanding bus commands configured through software. In the design, 4 is adopted.

2. The Max_OSD[m:0] and the Cfg_OSD[m:0] are selected according to a selection signal Sel generated by the comparing module (Compare).

3. In a direct memory access controller (DMA Controller), a data reading command of an advanced extensible bus AXI bus is sent according to the obtained value of the maximum depth of outstanding bus commands and a current data request status, but the maximum number of sent commands is controlled within a range of a value of the maximum depth of outstanding bus commands.

The status value of the display buffer is an absolute value of an address difference between a read pointer and a write pointer. The display buffer monitoring module is configured to compare the status value of the display buffer with the preset warning value of the display buffer, and determine whether the status value of the display buffer is larger or smaller than or equal to the preset warning value of the display buffer. The module for controlling a depth of outstanding bus commands adjusts the value of the depth of outstanding bus commands to the value of the maximum depth of outstanding bus commands or the value of the typical depth of outstanding bus commands.

In addition, the apparatus described in this embodiment further includes a variable-frequency bus adaptation module configured to adjust a bus frequency when it is again detected, after the depth of outstanding bus commands is controlled to be the value of the maximum depth of outstanding bus commands, that the status value of the display buffer is smaller than the preset warning value of the display buffer. If the load decreases and it is detected that a status about the number of idle data bits of the display buffer is larger than the preset warning value of the display buffer, the bus frequency is preferentially reduced and power consumption of a system is preferentially reduced; and if decrease of the load is still detected after the bus frequency is reduced, the value of the depth of outstanding bus commands is further adjusted.

The present invention further provides a display device that includes the display control system described in Embodiment 3.

After the display device is powered on, processed image data that needs to be displayed is stored in a DDR (Double Data Rate: double data rate synchronous dynamic random access memory) according to a requirement of an application program, where the DDR connects to an SOC. A CPU instructs a display controller to read the image data and output it to a display module group. An entire application process is implemented by repeating this procedure. In addition, in the present invention, the depth of outstanding bus commands is automatically adjusted according to the load of a system in this display procedure to guarantee display bandwidth, and at the same time, it is ensured that an advanced extensible interface AXI bus operates at a proper frequency to attain a proper energy efficiency ratio. This solution may be used for multiple applications, such as playing a video, making a video conversation, playing a 2D or 3D game, and browsing a web page in a mobile multimedia device, but the present invention is not limited by these applications. Any process in the display of a mobile multimedia device for automatically adjusting the depth of outstanding bus commands according to the load of a system to guarantee display bandwidth shall belong to the present invention. The present invention may be applied to any multimedia device, such as a standard-definition or high-definition TV control chip, a standard-definition or high-definition set top box chip, and a security monitoring chip, in addition to a mobile application processor.

In the embodiment of the present invention, a system that a depth of outstanding bus commands is adjusted according to the load of the system reflected by a status value of a display buffer, to guarantee a display bandwidth, and at the same time ensure that the system operates at a proper operating frequency, thereby ensuring that a splash screen or erratic display does not occur and implementing a display solution with a high energy efficiency ratio and a relatively low cost for a mobile multimedia device.

The foregoing description is merely about exemplary embodiments of the present invention, but is not intended to limit the present invention. Any modification, equivalent replacement, and improvement made within the idea and principle of the present invention shall fall within the protection scope of the present invention.

What is claimed is:

1. A display control method, comprising:
    acquiring, by a processor, a status value of a display buffer;
    comparing the status value of the display buffer with a preset warning value of the display buffer; and
    adjusting a value of a depth of outstanding bus commands according to a comparison result, wherein
    adjusting the value of the depth of outstanding bus commands comprises:
    when the status value of the display buffer is smaller than the preset warning value of the display buffer, controlling the value of the depth of the outstanding bus commands to be a value of a maximum depth of the outstanding bus commands; and
    when the status value of the display buffer is not smaller than the preset warning value of the display buffer, controlling the value of the depth of the outstanding bus commands to be a typical value.

2. The display control method according to claim 1, further comprising:
    presetting the preset warning value of the display buffer.

3. The display control method according to claim 1, wherein the acquiring the status value of the display buffer comprises:
    reading a read pointer signal and a write pointer signal of the display buffer; and
    comparing addresses to which a read pointer and a write pointer point, and obtaining the status value of the display buffer.

4. The display control method according to claim 3, wherein the status value of the display buffer is a quantity of idle data bits of the display buffer or a quantity of data bits written in the display buffer.

5. The display control method according to claim 1, wherein the status value of the display buffer is: when a write pointer is before a read pointer, an absolute value of an address difference between the read pointer and the write pointer is taken as the status value of the display buffer; when the read pointer is before the write pointer, the absolute value of the address difference between the read pointer and the write pointer is taken and then an absolute value of a difference between the absolute value and capacity of the display buffer is taken as the status value of the display buffer.

6. The display control method according to claim 5, wherein the controlling the value of the depth of the outstanding bus commands to be the value of the maximum depth of the outstanding bus commands when the status value of the display buffer is smaller than the preset warning value of the display buffer further comprises:

adjusting a bus frequency if it is at least twice detected that the status value of the display buffer is smaller than the preset warning value of the display buffer.

7. A display control system, comprising:
an acquirer of a system on chip (SOC) chip based on an advanced extensible interface (AXI) bus, configured to acquire a status value of a display buffer;
a comparator of the SOC chip, configured to compare the status value of the display buffer with a preset warning value of the display buffer; and
a value adjuster of the SOC chip, configured to adjust a value of a depth of outstanding bus commands according to a comparison result, wherein adjusting the value of the depth of outstanding bus commands comprises:
when the status value of the display buffer is smaller than the preset warning value of the display buffer controlling the value of the depth of the outstanding bus commands to be a value of a maximum depth of the outstanding bus commands; and
when the status value of the display buffer is not smaller than the preset warning value of the display buffer controlling the value of the depth of the outstanding bus commands to be a typical value.

8. The display control system according to claim 7, further comprising:
a value assignor of the SOC chip, configured to preset the preset warning value of the display buffer.

9. The display control system according to claim 7, wherein the acquirer of the SOC chip comprises:
a reading module, configured to read a read pointer signal and a write pointer signal of the display buffer; and
a first comparing module, configured to compare addresses to which a read pointer and a write pointer point and obtain the status value of the display buffer.

10. The display control system according to claim 9, wherein the status value of the display buffer is a quantity of idle data bits of the display buffer or a quantity of data bits written in the display buffer.

11. The display control system according to claim 7, wherein the status value of the display buffer is: when a write pointer is before a read pointer, an absolute value of an address difference between the read pointer and the write pointer is taken as the status value of the display buffer; when the read pointer is before the write pointer, the absolute value of the address difference between the read pointer and the write pointer is taken and then an absolute value of a difference between the absolute value and capacity of the display buffer is taken as the status value of the display buffer.

12. A display device, comprising a display control system, the display control system, comprising:
an acquirer of a system on chip (SOC) chip based on an advanced extensible interface (AXI) bus, configured to acquire a status value of a display buffer;
a comparator of the SOC chip, configured to compare the status value of the display buffer with a preset warning value of the display buffer; and
a value adjuster of the SOC chip, configured to adjust a value of a depth of outstanding bus commands according to a comparison result, wherein adjusting the value of the depth of outstanding bus commands comprises:
when the status value of the display buffer is smaller than the preset warning value of the display buffer, controlling the value of the depth of the outstanding bus commands to be a value of a maximum depth of the outstanding bus commands; and
when the status value of the display buffer is not smaller than the preset warning value of the dis la buffer controlling the value of the depth of the outstanding bus commands to be a typical value.

13. The display device according to claim 12, the display control system further comprising:
a value assignor of the SOC chip, configured to preset the preset warning value of the display buffer.

14. The display device according to claim 12, wherein the acquirer of the SOC chip comprises:
a reading module, configured to read a read pointer signal and a write pointer signal of the display buffer; and
a first comparing module, configured to compare addresses to which a read pointer and a write pointer point and obtain the status value of the display buffer.

15. The display device according to claim 14, wherein the status value of the display buffer is a quantity of idle data bits of the display buffer or a quantity of data bits written in the display buffer.

16. The display device according to claim 12, wherein the status value of the display buffer is: when a write pointer is before a read pointer, an absolute value of an address difference between the read pointer and the write pointer is taken as the status value of the display buffer; when the read pointer is before the write pointer, the absolute value of the address difference between the read pointer and the write pointer is taken and then an absolute value of a difference between the absolute value and capacity of the display buffer is taken as the status value of the display buffer.

* * * * *

UNITED STATES PATENT AND TRADEMARK OFFICE
CERTIFICATE OF CORRECTION

| | | |
|---|---|---|
| PATENT NO. | : 9,251,556 B2 | Page 1 of 1 |
| APPLICATION NO. | : 13/902081 | |
| DATED | : February 2, 2016 | |
| INVENTOR(S) | : Li et al. | |

It is certified that error appears in the above-identified patent and that said Letters Patent is hereby corrected as shown below:

In the claims,
Column 12, line 21, "dis la buffer" should read -- display buffer --.

Signed and Sealed this
Twenty-eighth Day of June, 2016

Michelle K. Lee
*Director of the United States Patent and Trademark Office*